C. W. GRESSLE.
FLANGE ROLLING MECHANISM.
APPLICATION FILED JUNE 19, 1915.

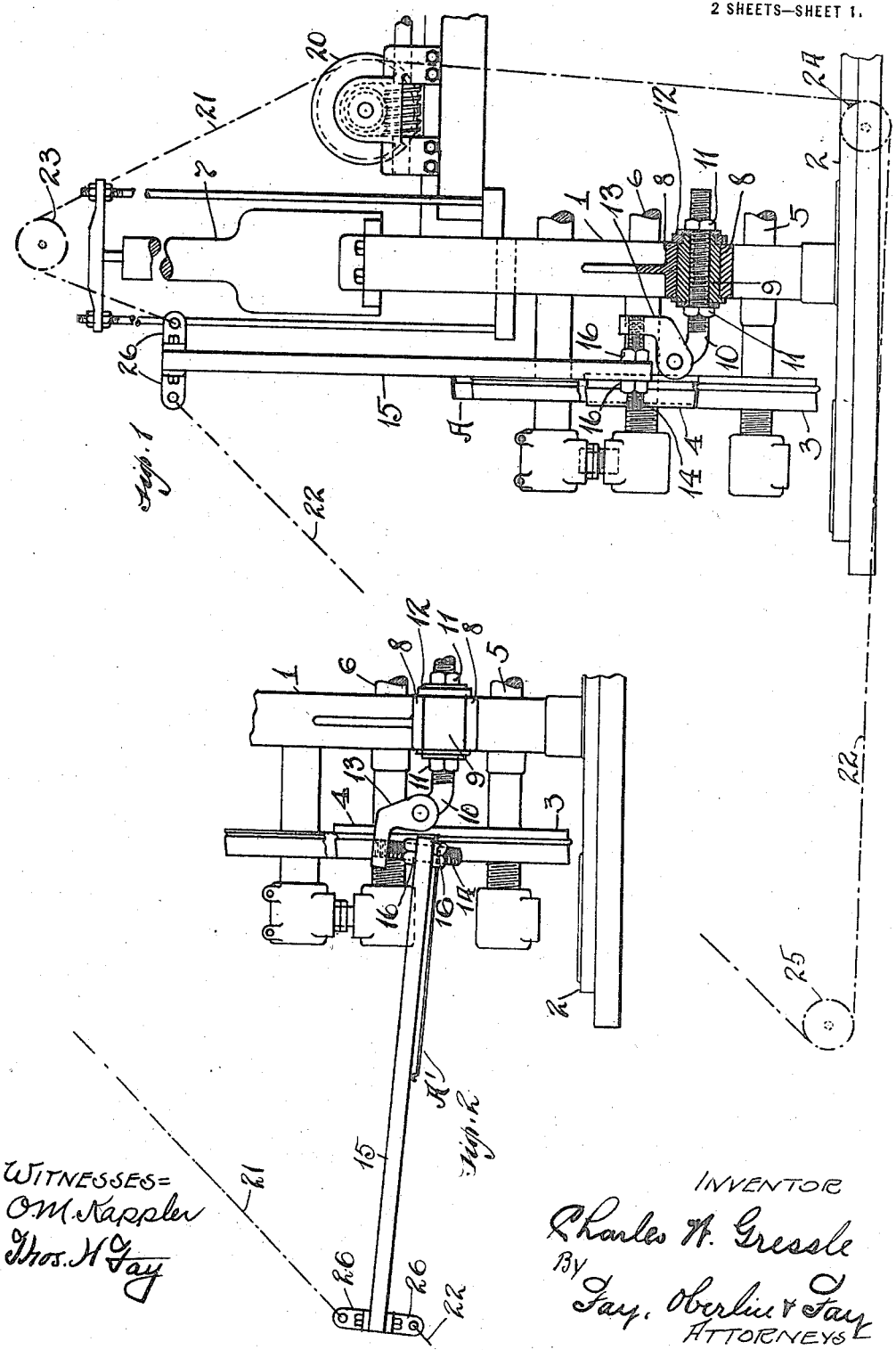

1,268,239.

Patented June 4, 1918.
2 SHEETS—SHEET 2.

WITNESSES
O. M. Kappler
Thos. H. Fay

INVENTOR
Charles W. Gressle
By
Fay, Oberlin & Fay
ATTORNEYS

UNITED STATES PATENT OFFICE.

CHARLES W. GRESSLE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

FLANGE-ROLLING MECHANISM.

1,268,239.   Specification of Letters Patent.   Patented June 4, 1918.

Application filed June 19, 1915. Serial No. 35,151.

*To all whom it may concern:*

Be it known that I, CHARLES W. GRESSLE, a citizen of the United States, and a resident of Cleveland, county of Cuyahoga, and State of Ohio, have invented a new and useful Improvement in Flange-Rolling Mechanism, of which the following is a specification, the principle of the invention being herein explained and the best mode in which I have contemplated applying that principle, so as to distinguish it from other inventions.

The present improvements, relating as indicated to mechanism for rolling flanges, have regard more particularly to the manufacture of side flanges such as are used in large numbers for retaining rubber tires, whether mounted on metal bases or not, on automobile and other vehicle wheels. It will be understood, however, that such mechanism is equally well adapted for the manufacture of articles of a similar character, whatever the particular field of use for which such articles may be designed. Ordinarily these flanges are formed from circular bands made by circling strips of flat stock of the proper length, and suitably welding the ends together, such bands being thereupon rolled into flat form so as to form a flange, or annular plate, of the desired size and cross-sectional form, it being understood that such flanges, instead of being perfectly flat, frequently are provided with a bead or rounded edge to engage with the tire, or tire-supporting rim.

The object of the present invention is to provide mechanism for thus rolling bands into the form of flanges or annular plates with a minimum expenditure of power, a further object being to so arrange the parts of the mechanism as to provide for rapid and convenient operation, particularly in placing the band into position and removing from the machine the finished flange. To the accomplishment of the foregoing and related ends the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 3:
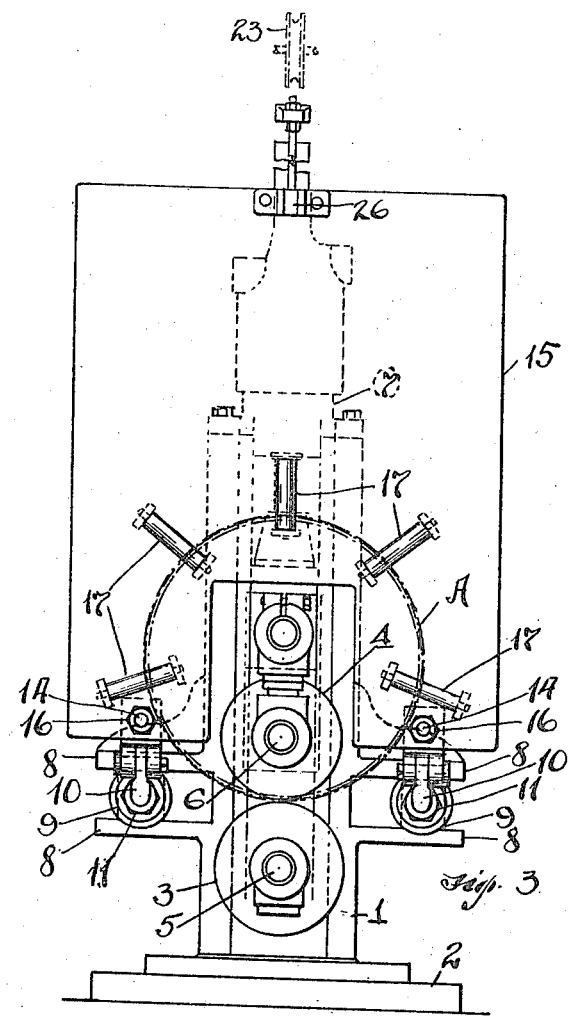

Figure 1 is a side elevational view with parts broken away, showing a machine embodying my present improvements; Fig. 2 is a similar side elevational view of a portion of such machine, showing the parts in a different operative position; Fig. 3 is a front elevational view of the machine with the parts in the same position as is illustrated in Fig. 1; and Fig. 4 is a front elevational view of the machine corresponding with Fig. 2 and showing the parts in the same position as in such Fig. 2.

The main frame 1, of the machine rises vertically from a suitable base 2, and is of substantial character so as to support properly the various operative parts. These include as principal elements, a pair of forming rolls, 3 and 4, mounted on horizontally disposed shafts, 5 and 6 respectively, the upper shaft 6, being capable of limited vertical movement in the frame so that the roll 4, carried thereby may be adjusted toward and away from the other roll 3. Suitable driving connections for positively operating these shafts are, of course, provided, it being deemed unnecessary to illustrate these. The vertical movement of the upper shaft 6, is preferably secured by means of a suitable hydraulic plunger 7, so that the roll 4, carried by said shaft may be pressed toward the lower roll 3 with considerable force. The details of the connection between this plunger and such upper shaft have likewise been omitted from the illustration, as they will be readily understood by those familiar with machines of this type.

Laterally extending from the frame 1 on planes intermediate between the axes of the two shafts 5 and 6, are extensions or arms 8, 8, forming between them spaces adapted to receive and slidably hold internally threaded blocks 9, one on each side of said frame. Threaded in each such block is a hinge support 10, the latter being fixedly secured in desired transverse position in the block by means of lock nuts 11, the rearmost of which presses against a washer 12, which in turn bears against the corresponding extensions 8, and so serves at the same time to clamp the block in desired position in the space beneath said extensions. The hinges 13, mounted on said supports 10, are pivotal about a common horizontal axis, said hinges being preferably of the form illustrated in Figs. 1 and 2 and carrying threaded studs 14, disposed to lie in the same plane as the supports. By means of these studs a plate or table 15, of the general form illustrated best in Fig. 3, is adjustably secured to said hinged members, being clamped thereto between two nuts 16, on the aforesaid studs 14, by adjustment of which the position of the plate with reference to the common pivotal axis of the hinges may be nicely adjusted.

Figure 4:
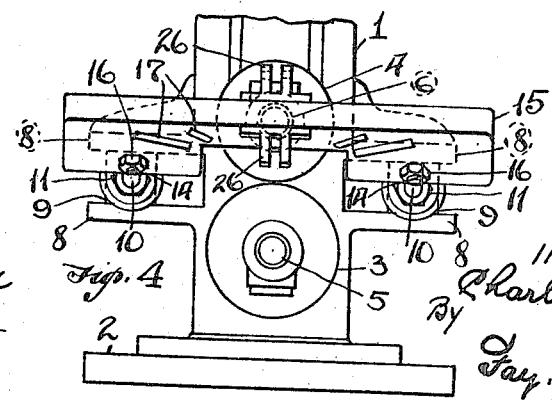

By reason of the mounting of the plate or table 15, as just described, the latter is free to swing from the approximately vertical position illustrated in Figs. 1 and 3 into the substantially horizontal position shown in Figs. 2 and 4.

When in such vertical position, assuming the shaft 6, to be raised so as to space the roll 4, carried thereby from the roll 3, on the shaft 5 below, a hoop or band A of the kind previously described may be inserted from the front of the machine, resting with its rear edge against the front face of the plate. A plurality of radially disposed anti-friction rollers 17, are desirably provided in the plate, as shown in Fig. 3, against which such edge rests instead of against the plate directly. When, now, rolls 3 and 4 are closed upon the band and started to operate, by simply tilting the plate 15, forwardly and allowing it to drop into the substantially horizontal position, the band will be rolled or flattened out into the form of the desired annular plate or flange A', as illustrated in Fig. 2.

The downward movement of the plate will be in the main effected by gravity, but to control its movement, and also to restore it to its vertical position, operative means as illustrated in Fig. 1 are provided, these consisting of a power-operated drum 20 suitably mounted on the frame or else wherever most convenient, upon which are reversely wound two cables 21 and 22, the first of which passes over a suitable pulley 23, above the frame of the machine, the other of which passes over two pulleys 24 and 25, lying approximately in line with the base of the machine. By rotating the drum in a counter-clockwise direction, viewing the same as illustrated in said Fig. 1, the plate 15 will be lowered, its movement being controlled by the unwinding of the first cable 21, and if necessary assisted by the winding up of the second cable 22. In order to raise the plate from the horizontal position illustrated in Fig. 2, to that of Fig. 1, the direction of rotation of the drum is simply reversed, whereupon the plate may be quickly restored to its initial operative position, the finished flange being in the meantime removed so that a fresh band can be inserted as soon as this position is reached.

The cables 21 and 22 will preferably be attached to the outer extremity of the plate, any suitable means being employed for this purpose, as for example clips 26, such as illustrated, one on the upper and the other on the lower side of the plate.

Not only is the arrangement of the foregoing machine such as to permit of the very convenient insertion and removal of the articles being operated upon, but the operation will obviously require but a minimum expenditure of power, gravity being utilized to assist in the stage where the greatest amount of work is being done. The general arrangement is exceedingly simple and at the same time ample provision is made for necessary adjustment of the parts, particularly of the axis of the table or plate, which it will be understood requires to be in the proper vertical plane with respect to the rolls, so that the band is flattened out without distortion.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination with a suitable frame; of two coöperative rolls mounted therein one above the other with parallel, approximately horizontal axes; blocks secured in said frame on a line transverse of the axes of said rolls, said blocks being adjustable along such line; hinge-supports threaded in said blocks so as to be adjustable on lines parallel with the axes of said rolls; lock-nuts adapted to simultaneously secure said blocks in adjusted position in said frame and said supports in said blocks; and a plate pivotally mounted on said supports, said plate being normally supported in a substantially vertical position and movable into a substantially horizontal position.

2. In a machine of the character described, the combination with a suitable frame; of two coöperative rolls mounted therein one above the other with parallel, approximately horizontal axes; blocks secured in said frame on a line transverse of the axes of said rolls, said blocks being adjustable along such line; hinge-supports threaded in said blocks so as to be adjustable on lines parallel with the axes of said rolls; lock-nuts adapted to simultaneously secure said blocks in adjusted position in said frame and said supports in said blocks; hinges pivotally mounted on said supports and carrying threaded studs disposed to lie in the same plane as said supports; and a plate adjustably secured to said studs, said plate being normally supported in a substantially vertical position and removable into a substantially horizontal position.

Signed by me, this 17 day of June, 1915.

CHARLES W. GRESSLE.

Attested by—
V. WILLIAMS,
R. C. COOLEY.

Copies of this patent may be obtained for five cents each, by addressing the "Commissioner of Patents, Washington, D. C."